United States Patent
Heinsey et al.

(10) Patent No.: US 7,324,882 B2
(45) Date of Patent: Jan. 29, 2008

(54) SYSTEM AND METHOD TO DETECT A FAILED SHEAR BOLT SUPPORTING A CONCAVE OF AN AGRICULTURAL COMBINE

(75) Inventors: David N. Heinsey, Stevens, PA (US); Barry E. Lehman, York, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/545,299

(22) Filed: Oct. 10, 2006

(65) Prior Publication Data

US 2007/0032935 A1 Feb. 8, 2007

Related U.S. Application Data

(62) Division of application No. 10/978,897, filed on Nov. 1, 2004.

(51) Int. Cl.
*A01D 41/127* (2006.01)
(52) U.S. Cl. .......................... 701/50; 56/10.2 J; 460/1; 460/107
(58) Field of Classification Search ................ 460/2–3, 460/107–110; 56/10.2 J, 10.3; 701/50
See application file for complete search history.

(56) References Cited

U.S. PATENT DOCUMENTS

| | | | |
|---|---|---|---|
| 2,113,666 A | 4/1938 | Suman | 192/150 |
| 2,124,965 A | 7/1938 | Lind | 192/150 |
| 3,552,396 A | 1/1971 | Gerhardt | 130/27 |
| 3,704,459 A | 11/1972 | Young | 340/271 |
| 3,793,512 A | 2/1974 | Lorenzen | 235/151.13 |
| 3,803,574 A | 4/1974 | Logue | 340/268 |
| 3,806,734 A * | 4/1974 | Rakcevic | 307/118 |
| 3,858,443 A | 1/1975 | Roberts, III et al. | 73/136 R |
| 4,253,472 A * | 3/1981 | Rayfield | 460/109 |
| 4,283,722 A | 8/1981 | Kito et al. | 340/685 |
| 4,415,888 A | 11/1983 | van der Lely | 340/684 |
| 4,483,128 A * | 11/1984 | Hawkins | 56/11.1 |
| 4,776,442 A | 10/1988 | Young | 192/56 R |
| 4,944,379 A | 7/1990 | Haaser | 192/150 |
| 5,017,912 A | 5/1991 | Willis | 340/679 |
| 5,090,307 A * | 2/1992 | Lippens et al. | 100/35 |
| 6,556,143 B2 | 4/2003 | Noah | 340/679 |
| 6,601,372 B1 * | 8/2003 | Heinsey et al. | 56/10.2 J |
| 6,637,179 B2 * | 10/2003 | Duncan | 56/10.2 J |
| 2003/0014171 A1* | 1/2003 | Ma et al. | 701/50 |

* cited by examiner

*Primary Examiner*—Jack Keith
*Assistant Examiner*—Ari Diacou
(74) *Attorney, Agent, or Firm*—Michael G. Harms; John William Stader; Patrick M. Sheldrake

(57) ABSTRACT

A system and method for detecting existence of a failed or broken shear bolt supporting all or a portion of a concave of a threshing system of an agricultural combine and utilizing information relating to rates of movement and absence of movement of a concave to determining the existence and non-existence of a failed or broken shear bolt supporting the concave. More particularly, the present system and method is operable to diagnose existence of a broken shear bolt from a rapid downward movement of the concave and non-movement of the concave during operation of a driver for repositioning the concave. Also, existence of a false broken concave condition can be diagnosed by movements of the concave responsive to operation of the driver.

5 Claims, 5 Drawing Sheets

SYSTEM AND METHOD TO DETECT A FAILED SHEAR BOLT SUPPORTING A CONCAVE OF AN AGRICULTURAL COMBINE

This divisional application claims priority under 35 U.S.C. § 120 from co-pending U.S. patent application Ser. No. 10/978,897 filed on Nov. 1, 2004 by David N. Heinsey et al. with the same title, the full disclosure of which is hereby incorporated by reference.

TECHNICAL FIELD

This invention relates generally to a system and method for detecting existence of a failed or broken shear bolt supporting all or a portion of a concave of a threshing system of an agricultural combine and, more particularly, to a system and method which utilizes information relating to rates of movement and absence of movement of a concave to determine the existence and nonexistence of a failed or broken shear bolt.

BACKGROUND ART

Commonly, one or more shear bolts are utilized in support of a concave or a section of a concave extending partially around a bottom portion of a rotor of a threshing system of an agricultural combine, which shear bolt or bolts are designed to fail or break to allow the concave or concave section to fall away from the rotor when large slugs of crop material and/or hard foreign objects enter the space between the concave segment and the rotor. This is intended to prevent damage to the threshing system, but also results in degraded performance of the threshing system Typically, if a shear bolt breaks to allow a segment of the concave to fall away from the rotor, contamination in the clean grain and/or discharge of larger pieces of crop material from the crop residue system of the combine will be noticed. Often, the investigation into the decreased performance will begin or will be concentrated on the cleaning system of the combine, such that excessive machine downtime may be required before the failed concave shear bolt is discovered.

Thus, what is sought is a manner of detecting a failed or broken concave shear bolt automatically and quickly, and which is simple and economical to implement.

SUMMARY OF THE INVENTION

What is disclosed is a system and method for detecting a failed or broken shear bolt supporting a concave of a threshing system of an agricultural combine, which provides one or more of the sought after benefits set forth above.

According to a preferred aspect of the invention, the threshing system includes a rotatable rotor and at least one concave segment extending around a lower region of the rotor in spaced relation thereto. One longitudinally extending edge of the concave segment is preferable pivotally or hingedly supported to allow movement of the concave segment upwardly and downwardly in relation to the rotor. Such upward and downward movement is preferably accomplished by a driver, which can be, for instance, but is not limited to, a rotary or linear electric motor or actuator, a fluid cylinder, or the like, connected to the concave by a linkage including a shear bolt designed to fail or break when a force is applied against the concave urging it away from the rotor and of a sufficient magnitude to potentially damage the rotor and/or concave. The system also preferably includes a device or sensor such as, but not limited to, a potentiometer or Hall Effect sensor, for sensing or determining a position of the concave relative to the rotor or another suitable location.

According to a preferred method of operation of the system, the position of the concave is monitored and, if a rate of change of the position in a downward direction exceeds a predetermined value, it is determined that the shear bolt is failed or broken, and a signal representative thereof is outputted. If the concave is at or near its lowest position when the driver is operated to raise the concave, the position thereof will be monitored and, if the position does not change accordingly, it will be determined that the shear bolt is broken.

Additionally, if the shear bolt is indicated as being broken and the drive is operated and corresponding movement of the concave is determined, the broken shear bolt condition will be determined to be false.

As a result, both the existence and absence of a failed or broken shear bolt can be determined according to the system and method of the present invention.

DETAILED DESCRIPTION OF THE INVENTION

Figure 1:
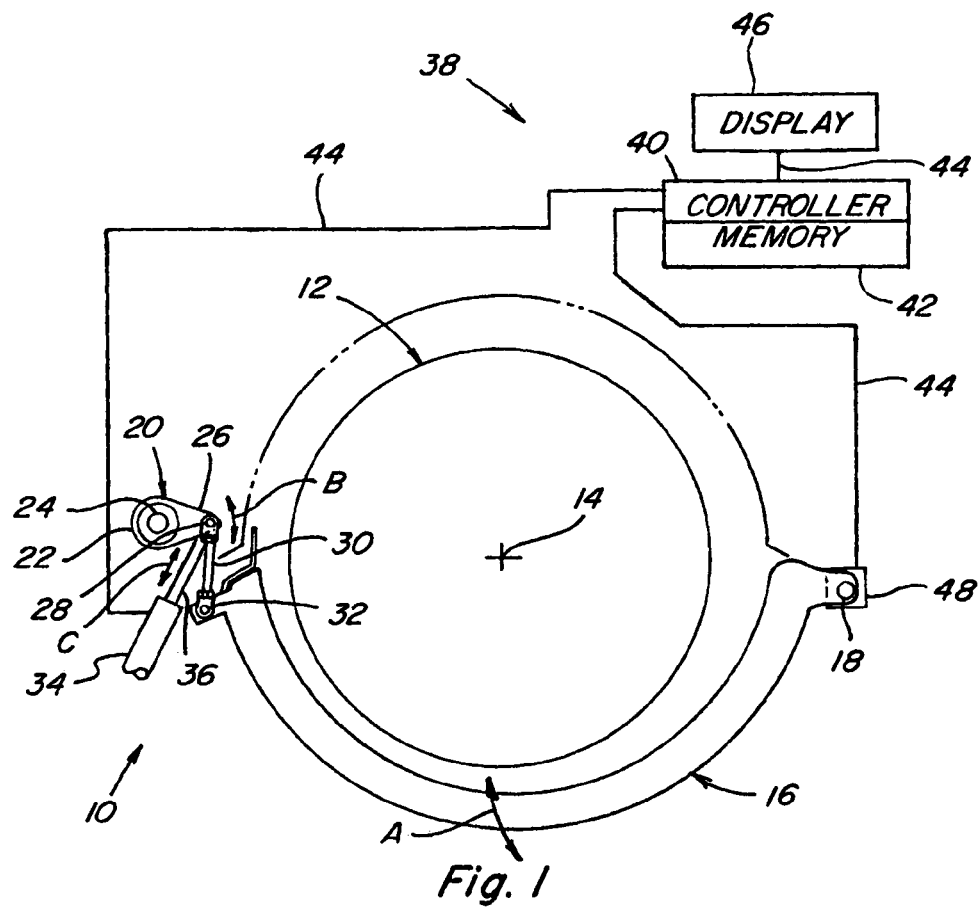
FIG. 1 is a simplified schematic representation of a rotor and concave of a threshing system of an agricultural combine, showing elements of a system including a representative driver controllably operable for moving the concave relative to the rotor, and a linkage including an intact shear bolt connecting the driver to the concave, the system being operable for detecting failure or breakage of the shear bolt according to the invention.
Figure 2:
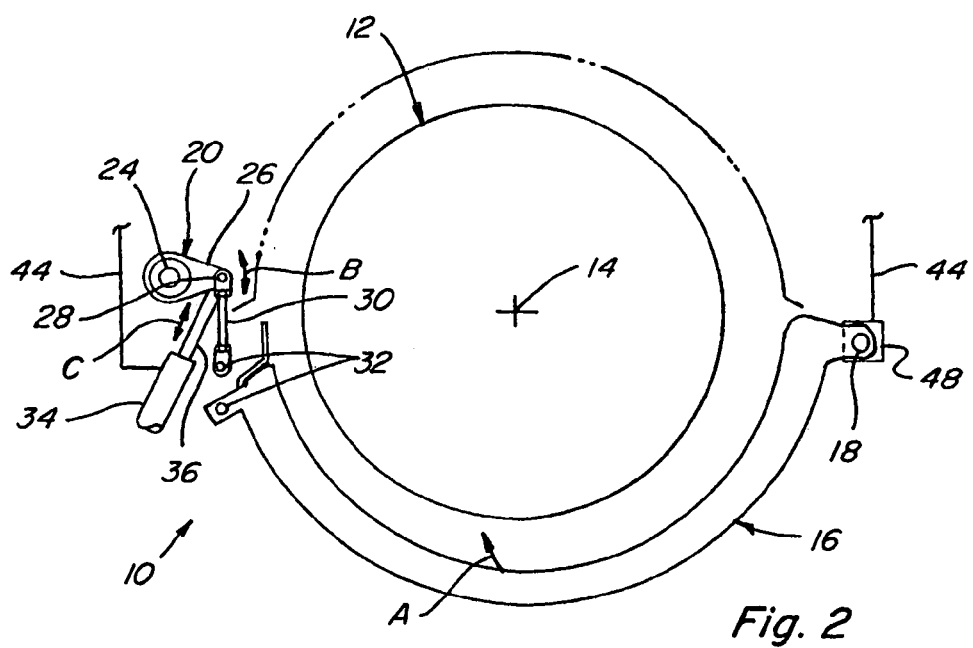
FIG. 2 is another simplified schematic representation of the rotor and concave of FIG. 1, showing the shear bolt broken to disconnect the driver from the concave and allow the concave to fall away from the rotor.

Referring now to the drawings, in FIGS. 1 and 2, representative threshing apparatus 10 of a threshing system of an agricultural combine is shown. Threshing apparatus 10 includes a cylindrical rotor 12 rotatably driven about a central longitudinal axis 14 therethrough. Threshing apparatus 10 also includes at least one semi-cylindrical shaped concave 16 positioned so as to extend around a lower region of rotor 12 of all or a segment of the length thereof. Here, it should be recognized or understood that concave 16 is intended to be representative of a concave that extends longitudinally along only a portion of the length of rotor 12, or along the entire length thereof. Concave 16 is shown supported along one longitudinally extending edge thereof, by a pin 18, for pivotal movement relative to rotor 12, as generally denoted by arrows A. In this regard, in FIG. 1, concave 16 is shown in what would be considered an operative position in spaced relation to an outer cylindrical surface of rotor 12, for threshing and separating grain introduced with other crop material in the space between rotor 12 and concave 16. The separated grain would then pass through holes or perforations in the surface of concave 16 so as to subsequently fall or be conveyed into a cleaning system (not shown) of the combine for further processing in the well known manner. The opposite longitudinally extending edge of concave 16 is supported by a linkage assembly 20 including a link arm 22 supported for rotation on a pin 24 connected to a frame or other structural member of the combine for rotation thereabout, as denoted by arrows B, a distal end 26 of link arm 22 being pivotally connected by a bolt 28 to a link 30 which, in turn, is connected by a shear bolt 32, to concave 16. Link arm 22 is additionally connected to a driver 34 including a rod 36 extendable upwardly, and retractable downwardly, as denoted by arrows C, for rotating distal end 26 of link arm 22 upwardly and downwardly, as denoted by arrows B, for raising and lowering link 30 and concave 16 as denoted by arrows A.

Here, it should be noted and understood that driver 34 is representative of a wide variety of drivers and actuators that could be used in connection with concave 16 for raising and lowering it to achieve a desired spacing in relation to rotor 12, which drivers and actuators can include, but are not limited to, electric rotary and linear motors or actuators, fluid cylinders and the like. It should also be understood that linkage assembly 20 is but an example of a wide variety of different linkage assemblies and arrangements and other apparatus that can be used in connection between a driver, such as driver 34, and concave 16 for effecting movement of concave 16.

Referring more particularly to FIG. 1, driver 34 is controllably operable by a control system 38 preferably including a suitable controller 40 such as a conventional processor based controller including a memory 42 and connected by one or more conductive paths 44 to driver 34 and a signal or display device 46, and also to a position sensor 48 associated with concave 16 for determining a position thereof relative to rotor 12 or another location and outputting information representative thereof to controller 40. Here, position sensor 48 is in connection with pin 18 so as to be operable for determining a pivotable or rotational position of concave 16 about an axis of rotation of pin 18, although it should be understood that a wide variety of other sensor devices, such as a proximity sensor or the like, could be used for determining the position of concave 16. More particularly in this regard, position sensor 48 can be a commercially available and conventionally operable potentiometer or Hall Effect sensor, as just two examples.

As noted previously, in FIG. 1, concave 16 is shown at an operative position in a selected spaced relation to rotor 12, for separating grain from other crop material introduced into the space by the rotation of rotor 12 in the well known manner. In contrast, in FIG. 2, concave 16 is shown dropped or fallen from link 30 of linkage assembly 20 to a non or less operative position, as a result of failure or breakage of shear bolt 32 in such a manner so as to cause disconnection of link 30 from concave 16. Here, by the term "failure", what is meant is a shearing or other breakage of shear bolt 32 in such a manner that concave 16 is disconnected or disengaged from link 30, so as to be capable of freely falling downwardly away from rotor 12 to thereby enlarge the space therebetween. This will typically occur as a result of induction or passage of a large slug or slugs of dense crop material into the space between rotor 12 and concave 16, or the induction of hard foreign objects into the space, which, at least partially as a result of the rotation of rotor 12, will apply a radially outwardly directed force against concave 16, which will be translated thereby and concentrated against the one or more shear bolts 32, which will have a predetermined load carrying capability. Thus, if the force applied against concave 16 and translated to the one or more shear bolts 32 exceeds the design limit of the shear bolt 32, the shear bolt will fail or break, thus releasing concave 16 to fall away from rotor 12, in the well known manner.

It has been observed that if a shear bolt 32 is broken by application of a force thereagainst exceeding the load limit thereof, the applied force can cause concave 16 to rapidly or abruptly fall away from rotor 12, so as to result in a rate of change in the position of concave 16 which will be greater than that which will typically occur as a result of normal movements of concave 16 by driver 34. Information representative of such rapid rate of change will be outputted by position sensor 48 to controller 40, which can be programmed to compare the sensed rate of change to one or more stored values which can be representative of, for instance, a maximum rate of normal downward movement of concave 16 by driver 34. As a result, if the sensed rate of positional change exceeds the stored value, controller 40 can be programmed to determine that a broken shear bolt condition exists. Controller 40 can then store information representative of this condition in memory 42 and, if desired, output a warning or alarm signal to a display, such as display 46, and/or to a warning alarm or the like for alerting the combine operator or other personnel.

As another aspect of the invention, if concave 16 is at a lower extreme or limit of its travel relative to rotor 12 and breakage of shear bolt 32 occurs, the rapid falling of concave 16 may not occur. However, subsequently, when driver 34 is operated for raising concave 16, if no corresponding raising or change in position of concave 16 is sensed by position sensor 48, for instance, for a specified period of time, controller 40 can be programmed to determine that a broken shear bolt condition exists and store information representative thereof and/or output a signal or alarm representative thereof, as desired.

Still further, if shear bolt 32 has been previously broken and repaired, or erroneously found to have been broken, controller 40 can operate driver 34 to move concave 16 and, if a resultant positional change is detected by position sensor 48, controller 40 can be programmed to determine that shear bolt 32 is intact or functional, and store information representative of that condition in memory 42 and/or output a signal representative thereof or cancel a signal or alarm indicating a broken shear bolt condition.

Further in this regard, it should be noted that it is contemplated that controller 40 can include one or more timers or clocks for timing operation of driver 34, and movement and/or non-movement of concave 16, and that memory 42 can include a variety of registers for holding information representative of the various times and positions of concave 16. As examples, such timers can include an initialize shear bolt variables timer; an update previous concave position timer; and a concave not moving timer. Such registers in memory 42 can include, for instance, a current concave position register; and a previous concave position register, either or both of which can be written over as desired. A flip-flop or flag register can also be utilized for storing an indication of a broken shear bolt condition.

Figure 3:
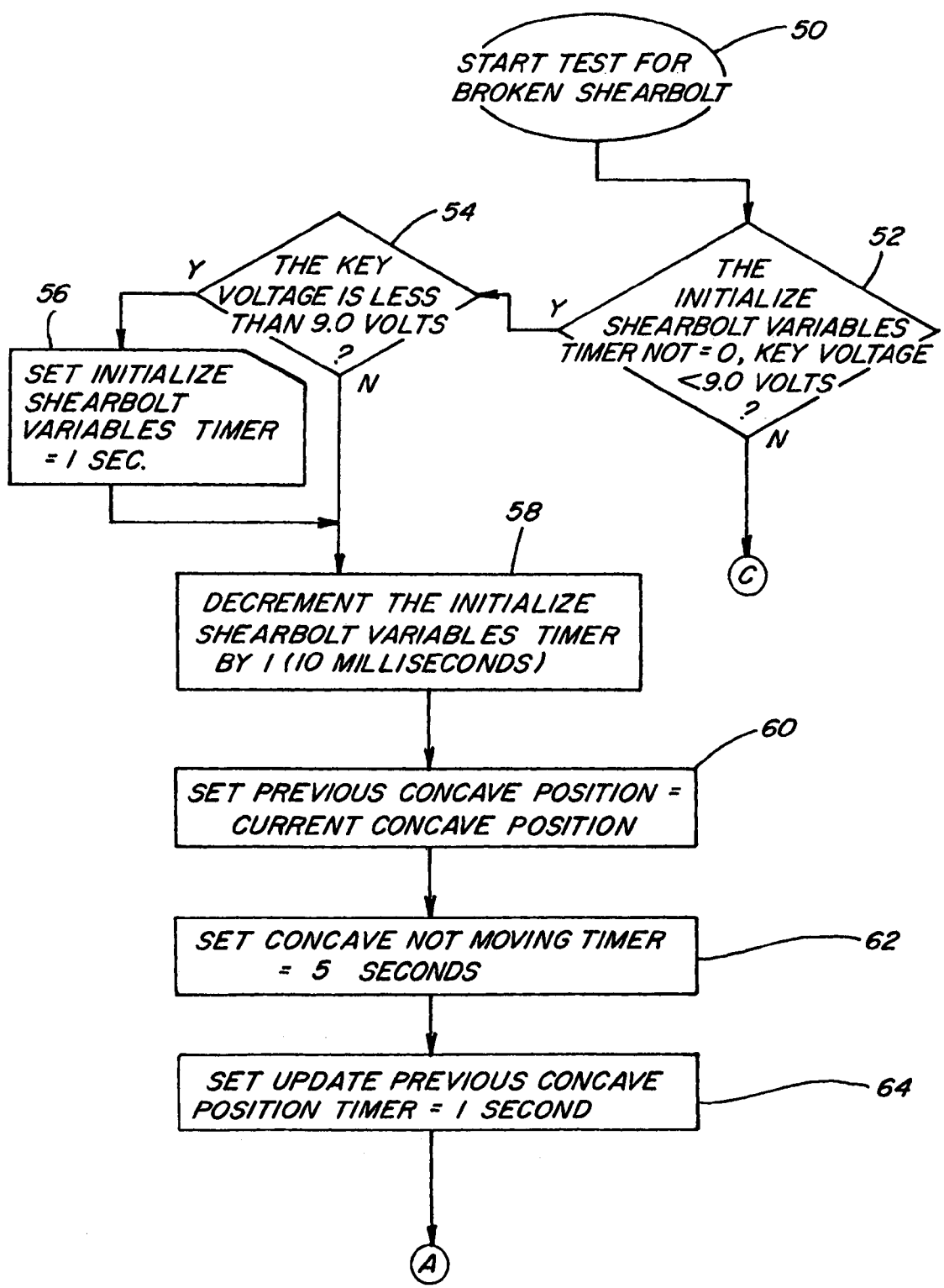
FIG. 3 is a high level flow diagram of steps of the method of operation of the system for detecting failure or breakage of the shear bolt of FIGS. 1 and 2.

Referring also to FIGS. 3, 4, 5 and 6, steps of a representative method of operation of system 38 for testing for a broken shear bolt and optionally verifying a broken shear bolt using the above referenced times and registers are set forth. In this example, driver 34 is represented by an electric motor. In FIG. 3, at block 50, the test is initiated. At system startup, it is desirable for the initialize shear bolt variables timer to be set to one second. The process for this is initialized at decision block 52 which determines whether the initialize shear bolt variables timer is not equal to zero, and a key voltage is less than a predetermined value, here, 9.0 volts. If both of these conditions are present, controller 40 will proceed to set the initialized shear bolt variables timer equal to one second, as denoted at decision block 54 and block 56. After the initialize shear bolt variables timer has been set equal to one second, or the key voltage is not less than 9.0 volts, controller 40 will proceed to decrement the initialize shear bolt variables timer by a value of one (equal to 10 milliseconds), as denoted by block 58. Then, the controller will set the previous concave position register equal to the current concave position; set the concave not moving timer equal to 5 seconds as denoted at block 62; and set the update previous concave position timer equal to one second as denoted at block 64.

Controller 40 will then proceed as denoted at A to end test block 66, then return to block 50 and follow this same sequence of steps as long as the initialize shear bolt variables timer is not equal to zero and/or the key voltage is less than 9 volts. Controller 40 can cycle through this series of steps, including steps 54, 56 and 58, wherein the initialize shear bolt variables timer will be decremented and reset, as long as the key voltage is less than 9 volts. If the key voltage rises to 9 volts or greater, at block 54, controller 40 will bypass block 56 and proceed to decrement the initialize shear bolt variables timer, reset the previous concave position to the current concave position, set the concave not moving timer to 5 seconds, and set the update previous concave position timer equal to one second, as set forth in blocks 58, 60, 62 and 64, then cycle through blocks 66 and 50 and 52, until the initialize shear bolt variables timer has been decremented to zero and the key voltage has remained at 9 volts or above.

Figure 4:
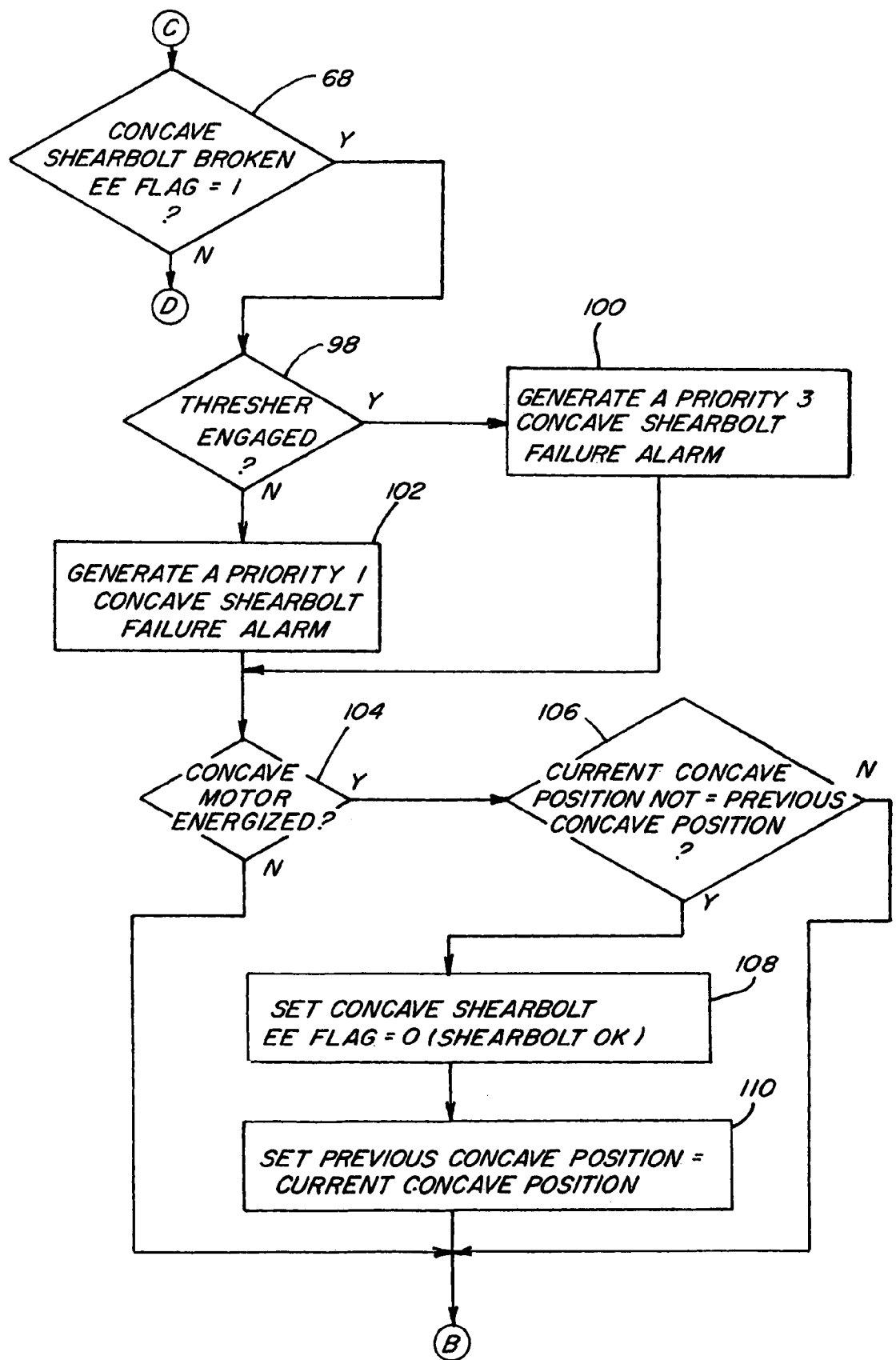
FIG. 4 is another high level flow diagram of steps of the method of operation of the system for detecting failure or breakage of the shear bolt of FIGS. 1 and 2.
Figure 5:
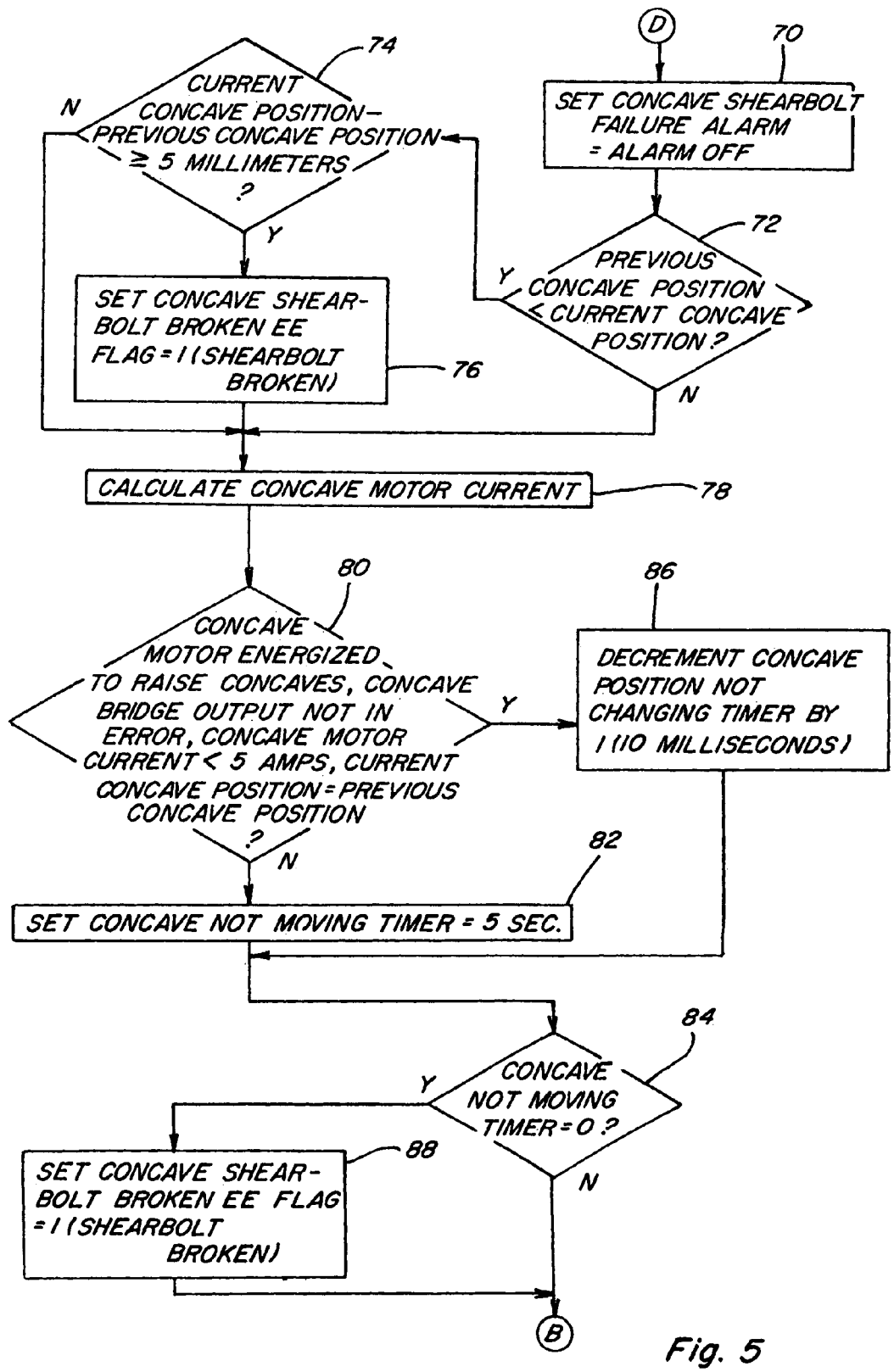
FIG. 5 is still another high level flow diagram of steps of the method of operation of the system for detecting failure or breakage of the shear bolt of FIGS. 1 and 2.

At block 52, once the initialize shear bolt variables timer is equal to zero, and the key voltage is still 9 volts or above, controller 40 will proceed from block 52, as denoted at C, to decision block 68 in FIG. 4, wherein controller 40 will determine whether a concave shear bolt broken flag is equal to one, denoting a broken condition. If, at block 68, it is determined that the flag is not equal to one, controller 40 will proceed as denoted at D, to block 70 in FIG. 5 wherein it will set the concave shear bolt failure alarm equal to an alarm off condition. Controller 40 will then proceed to decision block 72 to determine whether the previous concave position is less than the current concave position. Here, it should be noted that a lesser position value will denote a concave position closer to the rotor, whereas a greater concave position will denote a position farther from the rotor. If, for instance, referring to FIGS. 1 and 2, driver 34 has not been operated to move the concave, and controller 40 has most recently executed sequence of steps 58-64, the previous concave position will have been set equal to the current concave position. As a result, at step 72, the previous concave position should still equal the current concave position. If, on the other hand, driver 34 has been actuated for moving the concave up or down, the previous and current positions should differ accordingly. Also, at the run speed of controller 40, and the operating speed of driver 34 for moving the concave, any change in concave position equal to or greater than 5 millimeters between sequential executions of step 72, can be presumed to be indicative of an abrupt shear bolt failure and resultant fall of the concave.

Thus, at decision block 72, if the previous concave position is less than the current concave position, controller 40 will proceed to decision block 74 and determine whether the current concave position minus the previous concave position is greater than or equal to 5 millimeters. If not, any difference will be considered normal and controller 40 will proceed on to the next step. However, if there has been a large change in concave position, controller 40 will proceed to set the concave shear bolt broken flag equal to one which is representative of a broken shear bolt condition, as denoted at block 76. Here, it should be noted that the 5 millimeter value is intended to be a representative value only, and is not intended to limit the present invention.

Controller 40 will then proceed to calculate a concave motor current, as denoted at block 78, in preparation for testing whether the concave moves when driver 34 is operated to raise the concave. At decision block 80, controller 40 determines the presence of necessary conditions for this test, including whether the concave motor (driver 34) is energized to raise the concave, a concave bridge output is not an error, concave motor current is less than 5 amps, and the current concave position is equal to the previous concave position. If these conditions are not present, controller 40 will set the concave not moving timer to an initial value, here, 5 seconds, as denoted at block 82. Subsequently, controller 40 will determine whether the concave not moving timer is equal to zero, at decision block 84. If controller 40 has proceeded through steps 80 and 82, the concave not moving timer will be set at 5 seconds, such that at decision block 84, it will be determined that the concave not moving timer is not equal to zero, and controller 40 will proceed to the steps contained in FIG. 6. On the other hand, if all of the conditions of decision step 80 are present, controller 40 will decrement the concave position not changing timer by one (10 milliseconds), as denoted at block 86. Then, controller 40 will proceed to determine whether the concave not moving timer is equal to zero, and if yes, will proceed to set the concave shear bolt broken flag to one, representing a broken shear bolt condition, as denoted at block 88 then proceed as denoted at B to execute the steps of FIG. 6.

Here, essentially, if the current concave position equals the previous concave position for 5 seconds of operation of driver 34 for raising the concave, controller 40 is determining that a broken shear bolt condition exists. This is a useful test to be conducted when the concave may have been at its lowest position at the time of shear bolt breakage.

Figure 6:
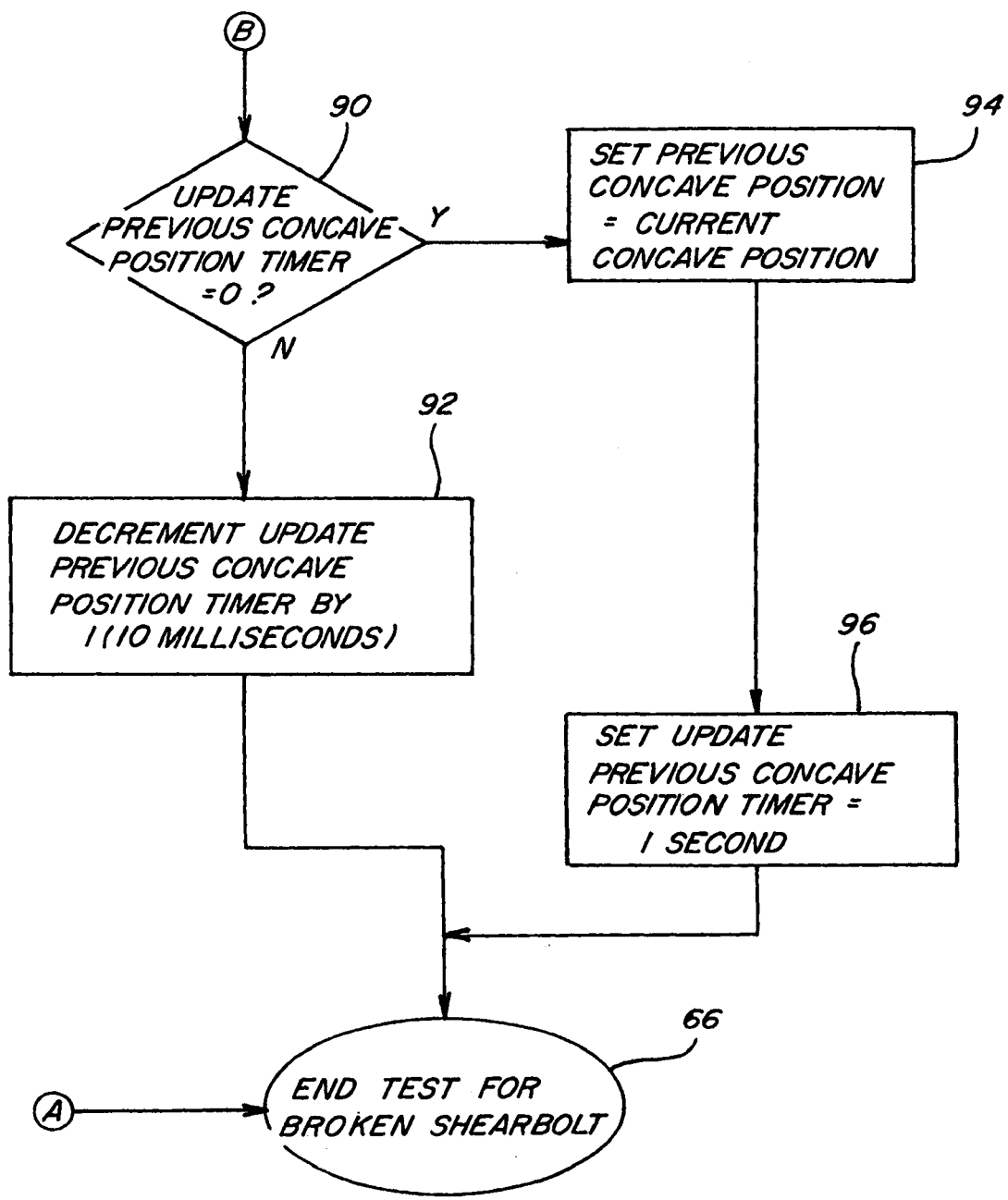
FIG. 6 is another high level flow diagram of steps of a method of operation of a system for detecting failure or breakage of the shear bolt of FIGS. 1 and 2.

Referring also to FIG. 6, after execution of the step of block 84 or the step of block 88, controller 40 will proceed to decision block 72 to determine whether the update previous concave position timer is equal to zero, at decision block 93. If no, it will proceed to decrement the update previous concave position timer by one (10 milliseconds), as denoted at block 92 and proceed to the end of the test. If the update previous concave position timer is equal to zero, the controller will set the previous concave position equal to the current concave position, as denoted at block 94. Then, at block 96, the update previous concave position timer will be set equal to one second and the test will end, as denoted at block 66.

Referring again to FIGS. 3 and 4, after initiating the test, as denoted at block 50; determining that both conditions of decision block 52 are not present; and having a concave shear bolt broken flag condition equals one (indicating a broken shear bolt condition) controller 40 will proceed through a sequence of steps to determine whether the broken shear bolt flag setting is erroneous. Here, at decision block 98, controller 40 determines whether the thresher is engaged. If yes, a priority 3 concave shear bolt failure alarm is outputted, as denoted at block 100. This is a high level alarm condition. If, on the other hand, at block 98 it is determined that the thresher is not engaged and running, a priority 1 concave shear bolt failure alarm will be outputted, as denoted at block 102. Then, controller 40 will determine whether the concave motor is energized, at decision block 104. If not, it will proceed, as denoted at B, to the sequence of steps shown in the diagram of FIG. 6. If, at block 104, it is determined that the concave motor is energized, controller 40 will proceed to determine whether the current concave position is not equal to the previous concave position, at decision block 106. If it is determined that the current and previous concave positions are equal, it will be determined that the broken shear bolt condition is true, and controller 40 will proceed to execute the steps of FIG. 6. If, at block 106, it is determined that the current concave position is not equal to the previous concave position, this is an indication that the concave has moved responsive to operation of driver 34. Accordingly, controller 40 will proceed to set the concave shear bolt flag to a zero condition, indicating that the shear bolt is intact, as denoted at block 108. The previous concave position will then be set equal to the current concave position, as denoted at block 110, and controller 40 will proceed to execute the steps of FIG. 6.

From the proceeding discussion, it should be apparent that control system 38 is operable according to the steps of the present invention, to diagnose a shear bolt failure or breakage condition as a result of an abrupt or rapid downward movement of the concave, as denoted by the sequence of steps 70, 72, 74 and 76. Additionally, if the concave is at or adjacent to the bottom of the range of normal positions thereof, a broken shear bolt condition can be diagnosed by the steps 80, 82, 84 and 86. Still further, if a broken shear bolt condition flag exists, the existence of a broken shear bolt, or non-existence thereof, can be determined by the steps of FIG. 4.

As a result of the operating steps of the system according to the present invention, a shear bolt failure condition can be accurately and quickly diagnosed and determined using the components used for moving and determining the position of the concave.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A system for detecting a broken shear bolt supporting a concave of an agricultural combine, comprising:
   a register for storing a plurality of concave positions and the associated time of the concave position into memory;
   a controller operable for periodically determining the position and timing of the concave and of setting the position and timing of the concave into the memory; and
   a processor programmable for determining a rate of change of the plurality of stored positions over the plurality of stored time periods and comparing the determined rate of change to a predetermined value and, if the rate of change exceeds the predetermined value, then determining that a broken shear bolt condition exists.

2. The system of claim 1, wherein the processor will determine the rate of change only when the stored value exceeds a predetermined minimum value.

3. The system of claim 2, further comprising a driver operable for moving the concave and, if the stored value is less than the predetermined value, when the driver is operated for raising concave, the processor will monitor the position of the concave over a time period and, if the concave has been raised by less than a predetermined amount during the time period, will determine that a broken shear bolt condition exists.

4. The system of claim 1, further comprising a driver controllably operable for moving the concave and, if a broken shear bolt condition has been determined and the driver is being operated, the processor will determine if the concave is moving and, if the concave is moving, then the processor will determine that a broken shear bolt condition does not exist.

5. The system of claim 1 further comprising a device connected to the processor operable for outputting a signal, the processor being operable such that when the processor determines that a broken shear bolt condition exists, the processor will cause a signal representative thereof to be outputted by the signal device.

* * * * *